(12) United States Patent
Deaville et al.

(10) Patent No.: US 10,328,642 B2
(45) Date of Patent: Jun. 25, 2019

(54) METHOD AND SYSTEM FOR MANUFACTURING A COMPOSITE TUBE NODE

(71) Applicant: Magna International Inc., Aurora (CA)

(72) Inventors: Todd Deaville, Markham (CA); Andrea Pretzler, Sankt Katharein an der Laming (AT)

(73) Assignee: Magna International Inc., Ontario (CA)

( * ) Notice: Subject to any disclaimer, the term of this patent is extended or adjusted under 35 U.S.C. 154(b) by 239 days.

(21) Appl. No.: 15/311,494

(22) PCT Filed: May 14, 2015

(86) PCT No.: PCT/CA2015/000319
§ 371 (c)(1),
(2) Date: Nov. 15, 2016

(87) PCT Pub. No.: WO2015/172233
PCT Pub. Date: Nov. 19, 2015

(65) Prior Publication Data
US 2017/0080652 A1  Mar. 23, 2017

Related U.S. Application Data

(60) Provisional application No. 61/994,463, filed on May 16, 2014.

(51) Int. Cl.
*B29C 70/48* (2006.01)
*B29C 70/72* (2006.01)
(Continued)

(52) U.S. Cl.
CPC .............. *B29C 70/72* (2013.01); *B29C 70/48* (2013.01); *B29K 2063/00* (2013.01);
(Continued)

(58) Field of Classification Search
CPC ............................... B29C 70/72; B29C 70/48
See application file for complete search history.

(56) References Cited

U.S. PATENT DOCUMENTS

| | | | | |
|---|---|---|---|---|
| 4,850,607 A | * | 7/1989 | Trimble | B29C 70/342 |
| | | | | 280/281.1 |
| 5,814,268 A | * | 9/1998 | Banchelin | A63B 53/10 |
| | | | | 264/516 |

(Continued)

FOREIGN PATENT DOCUMENTS

DE        10340339 A1    3/2005

*Primary Examiner* — Christopher T Schatz
(74) *Attorney, Agent, or Firm* — IPTechLaw

(57) ABSTRACT

A process includes disposing a mandrel assembly within a mold cavity bounded by mold forming surfaces. The mold is closed, first portions of the mandrel assembly seal against mold forming surfaces, and a continuous volume shaped as a node element is defined between second portions of the mandrel and the mold forming surfaces. A composite material is injected into the mold cavity filling the continuous volume, and cured forming the node element. The mandrel assembly is removed in sections exposing a node element opening. Tube-skeletons are inserted one each into openings of the node element, each tube-skeleton comprises foam core supported glass or carbon fabric materials. A resin material is injected into the mold cavity, such that the resin material permeates through the fabric material into a node element interior via the openings. The injected resin material is cured, thereby forming tube elements joined to the node element.

11 Claims, 7 Drawing Sheets

(51) Int. Cl.
  *B29K 63/00* (2006.01)
  *B29K 75/00* (2006.01)
  *B29K 105/08* (2006.01)
  *B29K 105/16* (2006.01)
  *B29L 23/00* (2006.01)
  *B29L 31/30* (2006.01)

(52) U.S. Cl.
  CPC .. *B29K 2075/00* (2013.01); *B29K 2105/0809* (2013.01); *B29K 2105/16* (2013.01); *B29L 2023/22* (2013.01); *B29L 2031/3091* (2013.01)

(56) References Cited

U.S. PATENT DOCUMENTS

| | | | |
|---|---|---|---|
| 2004/0207172 A1 | 10/2004 | Meggiolan | |
| 2005/0211843 A1* | 9/2005 | Simpson | B29C 70/342 244/119 |
| 2007/0261788 A1* | 11/2007 | Stenard | B29C 33/40 156/307.1 |
| 2012/0204741 A1* | 8/2012 | Bremmer | B29C 70/44 100/102 |

* cited by examiner

METHOD AND SYSTEM FOR MANUFACTURING A COMPOSITE TUBE NODE

CROSS-REFERENCE TO RELATED APPLICATIONS

This document is a National Stage Application submitted under 35 U.S.C. 371 of PCT application PCT/CA2015/000319, having an international filing date of May 14, 2015, listing as first inventor Todd Deaville, titled "Method and System for Manufacturing a Composite Tube Node," which in turn claims the benefit of the filing date of U.S. Provisional Pat. App. No. 61/994,463, filed May 16, 2014, listing as first inventor Todd Deaville, titled "Method and System for Manufacturing a Composite Tube Node," the disclosures of each of which are hereby incorporated entirely herein by reference.

FIELD OF THE INVENTION

The present invention relates to methods and systems for forming frames having a generally tubular construction. More particularly, the present invention relates to methods and systems for forming a composite tube node and integrated composite tubes for use in vehicular applications, including bicycles and motorcycles.

BACKGROUND OF THE INVENTION

Bicycles and motorcycles typically are built on a frame comprising metallic tubular members that are either welded together or joined using lugs or other connectors. The frame may include various other elements, such as for instance a head tube for holding the front fork and for allowing it to pivot and a seat tube for receiving a seat post, etc. Other systems and assemblies are attached to the frame, such as for instance suspension systems, braking assemblies, electrical systems, a motorcycle fuel tank, etc. Further, the frame provides rigidity, dissipates vibrations, and protects other systems in the event of a crash, etc.

Composite materials are also used in the construction of bicycle and motorcycle frames. Tubes are fabricated from fiber-reinforced resin materials and are joined together, typically using a connector element that is molded and bonded to the tubes that are being joined. By way of a few specific and non-limiting examples, cast aluminum or reinforced plastic shells may be used. Unfortunately, this assembly process is slow and expensive, requires additional tooling, and results in a relatively week connection since the connector element usually must be split to go over the tubes. Further, connecting tubes in this way produces a step in the resulting joint, which is aesthetically unpleasant.

In a different approach, an entire composite frame may be fabricated as a single part. This approach involves joining together tubular structural members, either by laying up several layers of an epoxy-containing carbon-fiber strip as described in U.S. Pat. No. 4,900,048, or by using a complex mold with appropriate internal pressurization bladders to form pre-preg blanks into the desired shape as described in U.S. Pat. No. 6,340,509. Unfortunately, the above-noted approaches are labor intensive, require complex and specialized tooling, and are unsuitable for some applications.

It would therefore be beneficial to overcome at least some of the above-mentioned limitations and disadvantages.

SUMMARY OF THE INVENTION

According to an aspect of at least one embodiment of the instant invention, a process is disclosed comprising: disposing a multi-part mandrel within a cavity that is defined between opposite forming surfaces of a mold, each part of the multi-part mandrel comprising a first portion that is dimensioned to form a seal with the forming surfaces of the mold, and a second portion that is dimensioned to define a space between the multi-part mandrel and the forming surfaces of the mold; forming a composite node element in a first molding step, comprising providing a composite material within the space between each part of the multi-part mandrel and the forming surfaces of the mold, and curing the composite material with the multi-part mandrel in place; withdrawing each part of the multi-part mandrel away from the formed node element, wherein withdrawing each part exposes an opening of the node element; assembling a tube-framework, comprising inserting tube-skeletons into the openings of the node element while the node element is within the mold, each tube-skeleton comprising a foam core supporting a tube-shaped covering of a fiber-containing fabric extending along a length of the foam core; and forming a composite tube element on each of the tube-skeletons in a second molding step, comprising injecting a resin material into the mold cavity such that the resin material permeates through the fiber-containing fabric and into an interior of the node element via the openings, thereby joining the formed tube elements to the node element.

According to an aspect of at least one embodiment of the instant invention, a process is disclosed comprising: disposing a mandrel assembly within a mold cavity that is bounded by forming surfaces of a mold; closing the mold such that first portions of the mandrel assembly seal against the forming surfaces of the mold, and such that a continuous volume having the shape of a node element is defined between second portions of the mandrel and the forming surfaces of the mold; injecting a composite material into the mold cavity to fill the continuous volume; curing the injected composite material to form the node element; removing the mandrel assembly in sections, wherein removing each mandrel section exposes an opening of the node element; inserting tube-skeletons into the openings of the node element, each tube-skeleton comprising a glass or carbon fabric material supported on a foam core; and injecting a resin material into the mold cavity such that the resin material permeates through the glass or carbon fabric material and into an interior of the node element via the openings; and curing the injected resin material, thereby forming tube elements joined to the node element.

According to an aspect of at least one embodiment of the instant invention, a system is disclosed comprising: a mold having opposite forming surfaces that define a mold cavity when the mold is in a closed condition, the opposite forming surfaces comprising first features for forming an outer surface of a node element and comprising second features for forming a first portion of an outer surface of each one of a plurality of tube elements; a multi-part mandrel fabricated from a resilient material and comprising first portions that are dimensioned for sealing against the second features of the forming surfaces of the mold, and comprising second portions that are dimensioned to define a continuous volume between the multi-part mandrel and the first features of the forming surfaces of the mold, the continuous volume having the shape of the node element; and a plurality of tube-skeletons, each tube-skeleton comprising a foam core that is encased by a fiber-containing fabric material, and each tube-skeleton being dimensioned at least at one end thereof substantially the same as the second portions of the multi-part mandrel.

According to an aspect of at least one embodiment of the instant invention, a system is disclosed comprising: a first mold having opposite forming surfaces that define a first mold cavity when the first mold is in a closed condition, the opposite forming surfaces comprising first features for forming an outer surface of a node element and comprising second features for forming a first portion of an outer surface of each tube element of a plurality of tube elements; a multi-part mandrel shaped to define a continuous volume between the multi-part mandrel and the first features of the forming surfaces of the mold, the continuous volume having the shape of the node element; a plurality of second molds, each second mold detachably mountable to the first mold and having opposite forming surfaces comprising third features for forming a second portion of the outer surface of a respective one of the plurality of tube elements; and a plurality of tube-skeletons, each tube-skeleton dimensioned to engage an inner surface of the node element, to extend away from the node element out of the first mold, and to extend into a respective second mold of the plurality of second molds, wherein the first portion and the second portion of the outer surface of each tube element of the plurality of tube elements is formed in a single molding step.

BRIEF DESCRIPTION OF TILE DRAWINGS

The instant invention will now be described by way of example only, and with reference to the attached drawings, wherein similar reference numerals denote similar elements throughout the several views. It should be understood that the drawings are not necessarily to scale. In certain instances, details that are not necessary for an understanding of the disclosure or that render other details difficult to perceive have been omitted.

DETAILED DESCRIPTION OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Figure 1A:
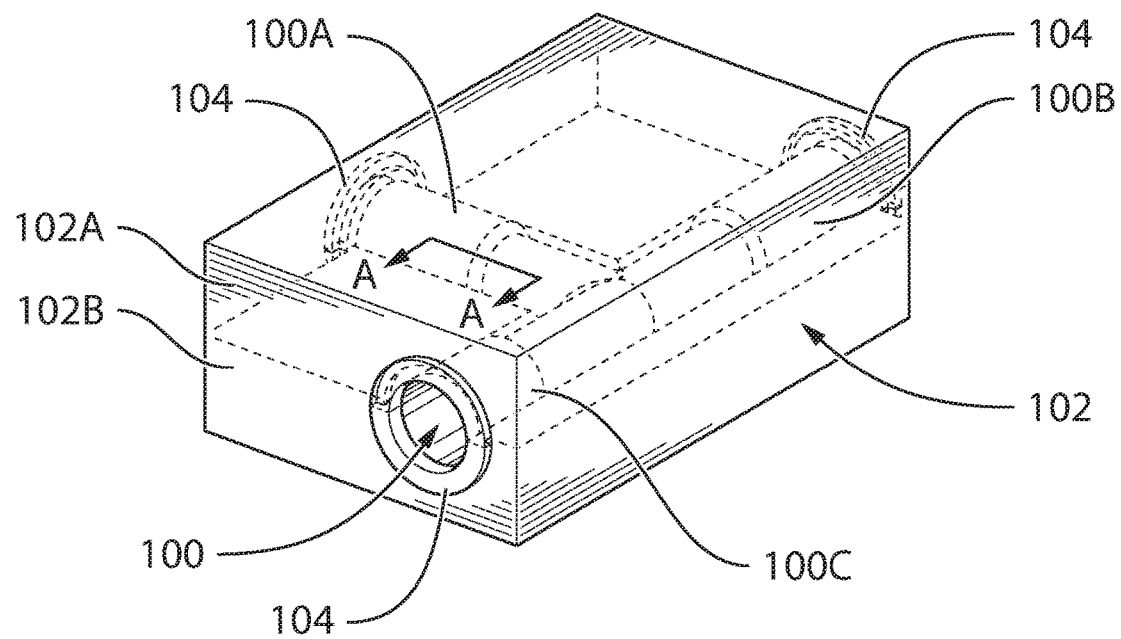
FIG. 1A is a simplified perspective diagram showing a multi-part mandrel within a mold cavity of a first mold.

FIG. 1A is a simplified perspective diagram showing a multi-part mandrel 100 disposed within a mold cavity of a first mold 102, the mold cavity being defined between opposite forming surfaces of an upper mold part 102A and a lower mold part 102B. In the specific and non-limiting example that is illustrated in FIG. 1A, the multi-part mandrel 100 includes three mandrel parts or segments 100A, 100B and 100C. The mold 102 also includes external tool-locating features 104, which are used for positioning and securing additional molds (not shown in FIG. 1A) adjacent to the mold 102, as discussed in greater detail in the following sections. Further, the mold 102 includes internal heating elements (not illustrated) for heat-curing composite materials within the mold during molding steps. Optionally, the parts 100A-C of the multi-part mandrel 100 are pinned together or otherwise temporarily joined using not illustrated fasteners, so as to facilitate placing the multi-part mandrel 100 into the mold cavity.

Figure 1B:
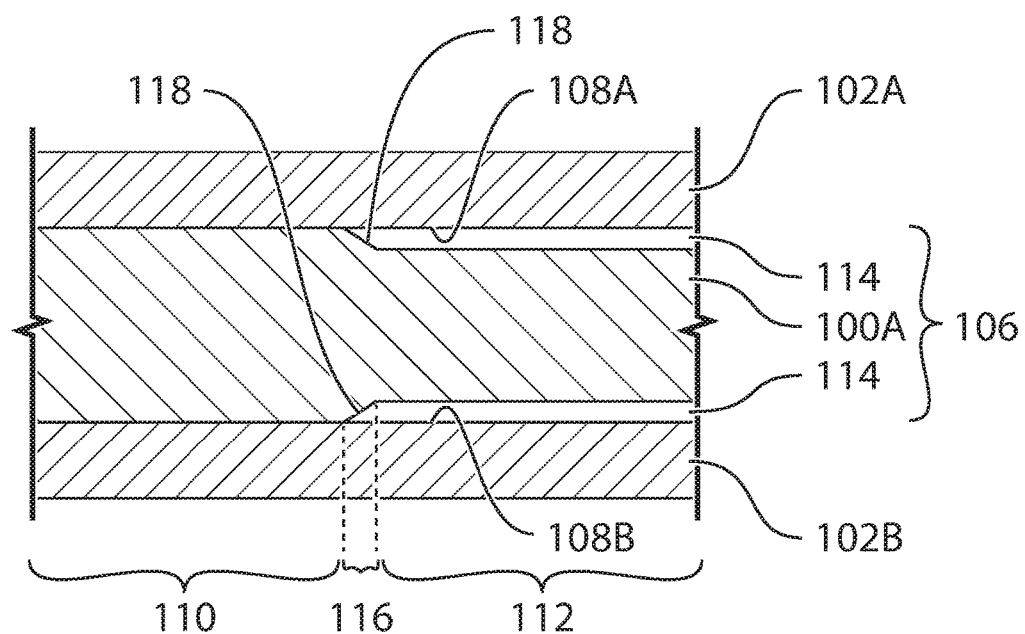
FIG. 1B is a cross-sectional view taken along the line A-A in FIG. 1A.

Referring now to FIG. 1B, shown is a cross-sectional view taken along the line A-A in FIG. 1A. The mandrel part 100A is shown disposed within mold cavity 106, which is defined between a forming surface 108A of the upper mold part 102A and an opposite forming surface 10813 of the lower mold part 102B. As shown in FIG. 1B, the mandrel part 100A has a first portion 110 that is dimensioned for sealing with the forming surfaces 108A and 108B of the mold 102, a second portion 112 that is dimensioned to define a space 114 between the mandrel part 100A and the forming surfaces 108A and 108B of the mold 102, and a third portion 116 joining the first portion 110 and the second portion 112. More particularly, the third portion 116 defines a tapered mandrel surface 118 between the first portion 110 and the second portion 112. As will be discussed in the following sections, the tapered mandrel surface 118 is for forming an inner beveled surface at a respective opening of a node element.

As is shown in FIG. 1A, each of the three mandrel parts 100A, 100B and 100C comprises a first portion, a second portion and a third portion (not labeled in FIG. 1A). The space that is defined between the second portion of each mandrel part 100A, 100B and 100C and the forming surfaces 108A and 108B of the mold define, in aggregate, a continuous volume having the shape of the node element. In this simplified example each one of the mandrel parts 100A-C has a circular shaped cross-section in a plane that is perpendicular to a length of the respective mandrel part. As such, a generally annular space is defined between the second portion of each of the mandrel parts 100A-C and the forming surfaces 108A and 108B of the mold 102, Optionally, at least one mandrel part has a non-circular shaped cross-section in a plane that is perpendicular to a length of said at least one mandrel part.

Figure 2A:
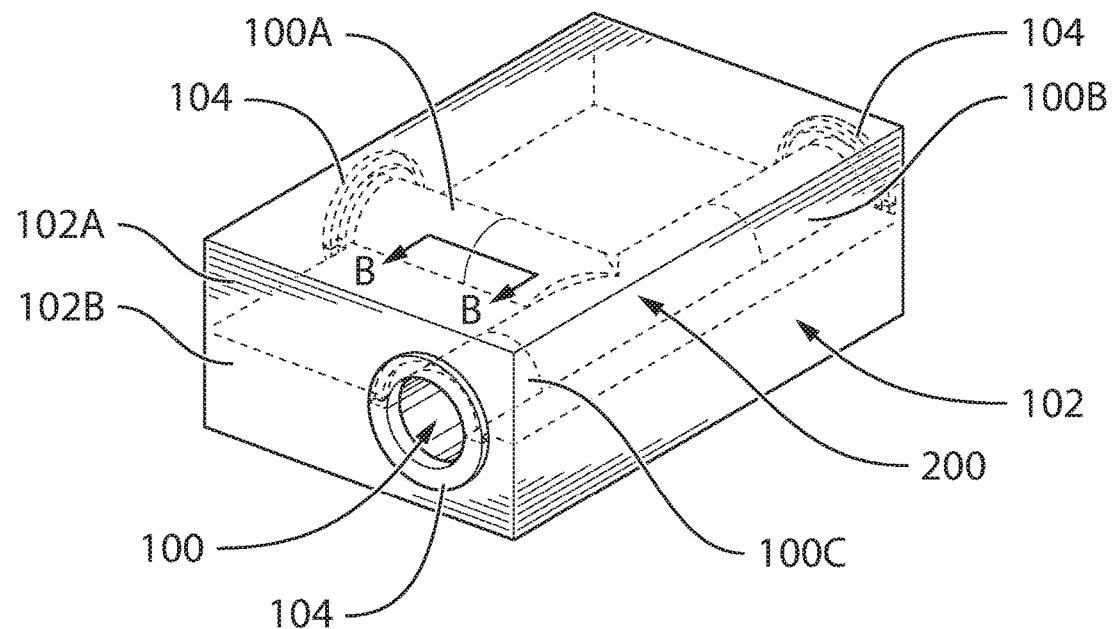
FIG. 2A is a simplified perspective diagram showing a composite node element fabricated with the multi-part mandrel of FIG. 1A in place.

FIG. 2A is a simplified perspective diagram showing a composite node element 200 that has been fabricated in the mold 102, with the multi-part mandrel 100 of FIG. 1A in place. More particularly, a composite material is placed within the continuous volume that is defined between the second portions of each of the mandrel parts 100A-C and the forming surfaces 108A and 108B of the mold 102. The composite material substantially fills the volume between the multi-part mandrel 100 and the forming surfaces of the mold 102, and extends to the tapered mandrel surface 118 of each of the mandrel parts 100A-C. The composite material is then heat-cured using internal heating elements (not shown) of mold 102, thereby forming the node element 200.

Figure 2B:
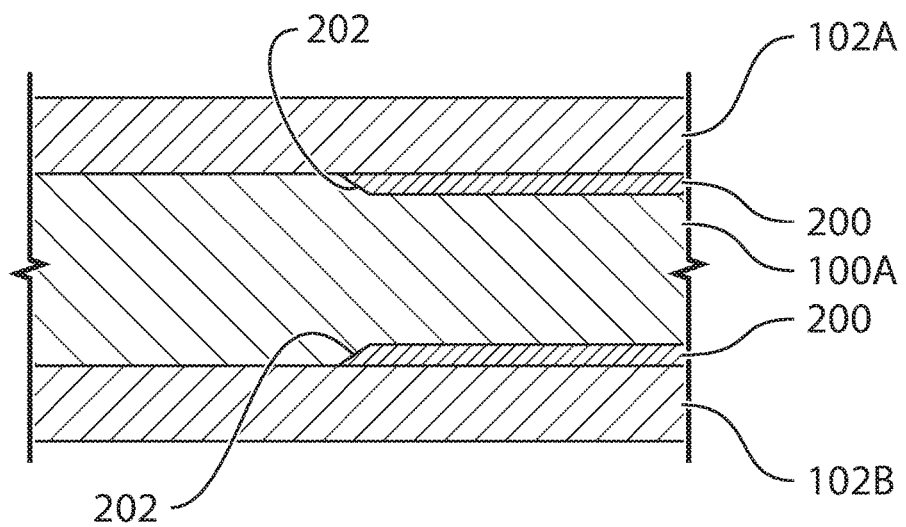
FIG. 2B is a cross-sectional view taken along the line B-B in FIG. 2A.

Referring now to FIG. 2B, shown is a cross-sectional view taken along the line B-B in FIG. 2A. The node element 200 is shown between the upper and lower mold parts 102A and 102B, respectively, and the mandrel part 100A. More particularly, the node element 200 is molded around the mandrel part 100A, such that the mandrel part 100A forms an opening of the node 200. Further, the tapered mandrel surface 118 of the mandrel part 100A forms a beveled inner surface 202 at the opening of the node 200.

By way of a specific and non-limiting example, a composite material comprising e.g., glass-fiber or carbon-fiber filled urethane or epoxy resin is injected into the volume via a resin injection port (not shown). The fibers in this specific example are relatively short, such as for instance 0.2-4 mm. The composite material continues to be injected until the volume is substantially filled. In this example, the multi-part mandrel 100 is optionally fabricated from silicone rubber or another material with a high coefficient of thermal expansion. During the heat-curing step the mandrel material expands and presses the composite material against the forming surfaces of the mold 102. Alternatively, the multi-part mandrel 100 is fabricated from carbon composite, steel, aluminum or another suitable material with a low coefficient of thermal expansion. In this case, the composite material is injected under sufficiently high pressure to ensure that the composite material is pressed against the forming surfaces of the mold 102.

By way of another specific and non-limiting example, a pre-prey, material comprising glass-fiber or carbon-fiber in an epoxy matrix material is wrapped around the second portions of the mandrel parts 100A-C. When the multi-part mandrel 100 is placed in the mold 102 and the mold 102 is closed, the pre-preg material substantially fills the volume that has the shape of the node element. In this example, the multi-part mandrel 100 is fabricated from silicone rubber or another material with a high coefficient of thermal expansion. During the heat-curing step the mandrel material expands and presses the pre-preg material against the forming surfaces of the mold 102.

Figure 3A:
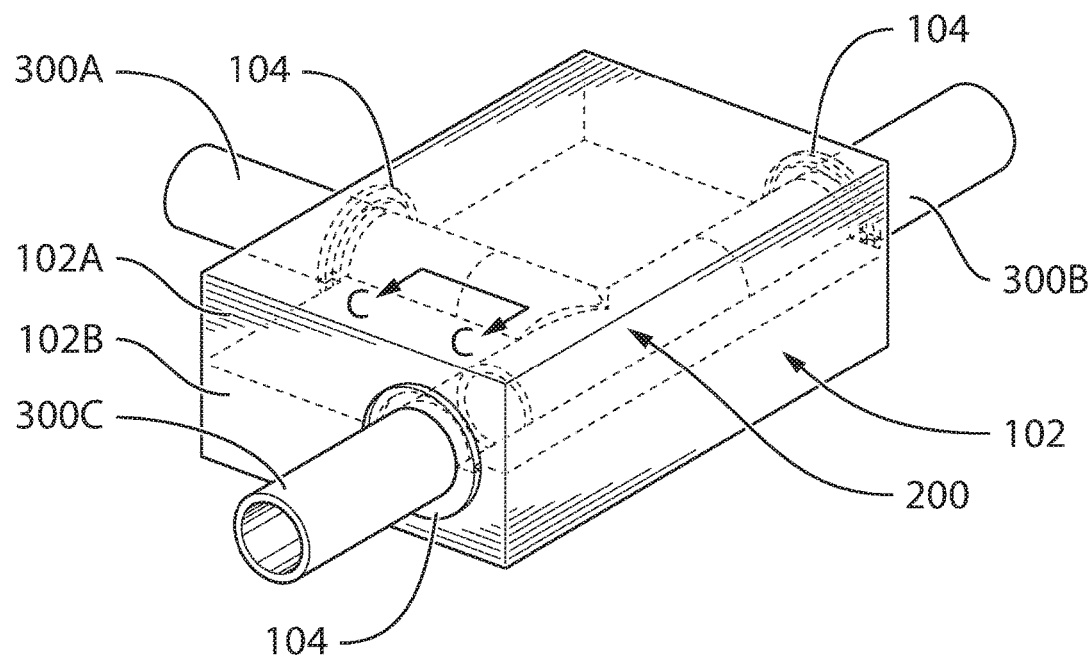
FIG. 3A is a simplified perspective diagram showing a plurality of tube-skeletons inserted into openings of the composite node element subsequent to removing the multi-part mandrel of FIG. 1A.

Subsequent to performing the heat-curing step, and with the formed node element 200 still in the mold 102, the mandrel parts 100A-C are withdrawn away from the formed node element 200. Removing the mandrel parts 100A-C exposes corresponding openings of the node element 200, which are in communication with one another via an open interior structure of the node element 200. FIG. 3A is a simplified perspective diagram showing a plurality of tube-skeletons 300A, 300B and 300C inserted into the openings of the composite node element 200, subsequent to removing the multi-part mandrel 100 of FIG. 1A.

Figure 3B:
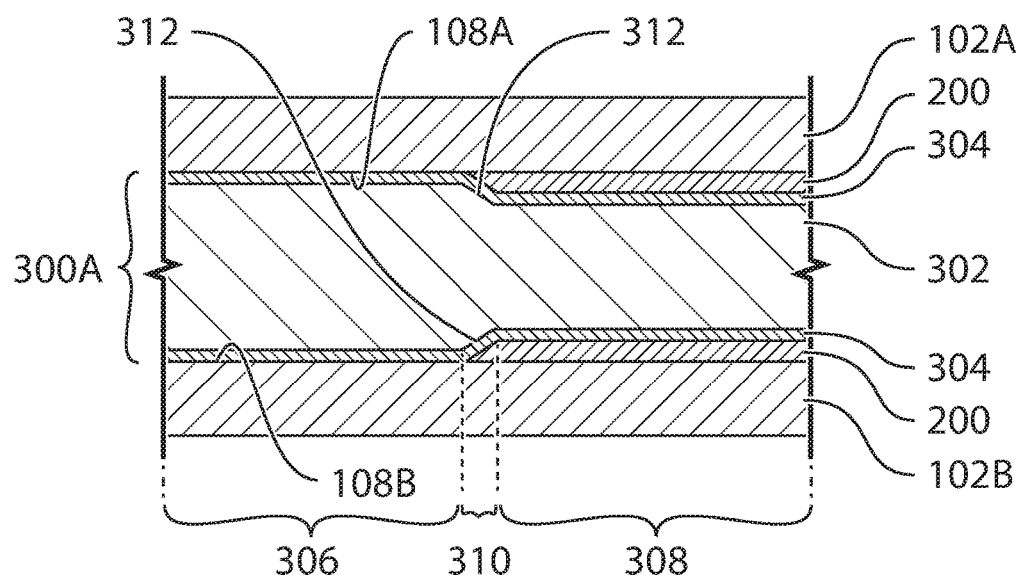
FIG. 3B is a cross-sectional view taken along the line C-C in FIG. 3A.

Referring now to FIG. 3B, shown is a cross-sectional view taken along the line C-C in FIG. 3A. The tube-skeleton 300A in FIG. 3B, which is considered to be representative of the tube skeletons 300A-C, comprises a foam core 302 that supports a braided or non-woven carbon or glass fabric material 304. The foam core 302 has a first portion 306 that is dimensioned larger than a second portion 308, and a third portion 310 that joins the first portion 306 and the second portion 308 and that defines a tapered core surface 312. When the tube-skeleton 300A is inserted into the opening of the node element 200, as is illustrated in FIG. 3B, the fabric material 304 occupies the spaces between the foam core 302 and either the interior surfaces of the node element 200 or the forming surfaces 108A and 108B of the mold 102. The tapered core surface 312 of the foam core 302 is complementary to the inner beveled surface 202 at the opening of the node element 200. As will be apparent to one of ordinary skill in the art, the tapered core surface 312 and the inner beveled surface 202 facilitates the joining of the tube element to the node element absent a material step at the joint seam.

Figure 4A:
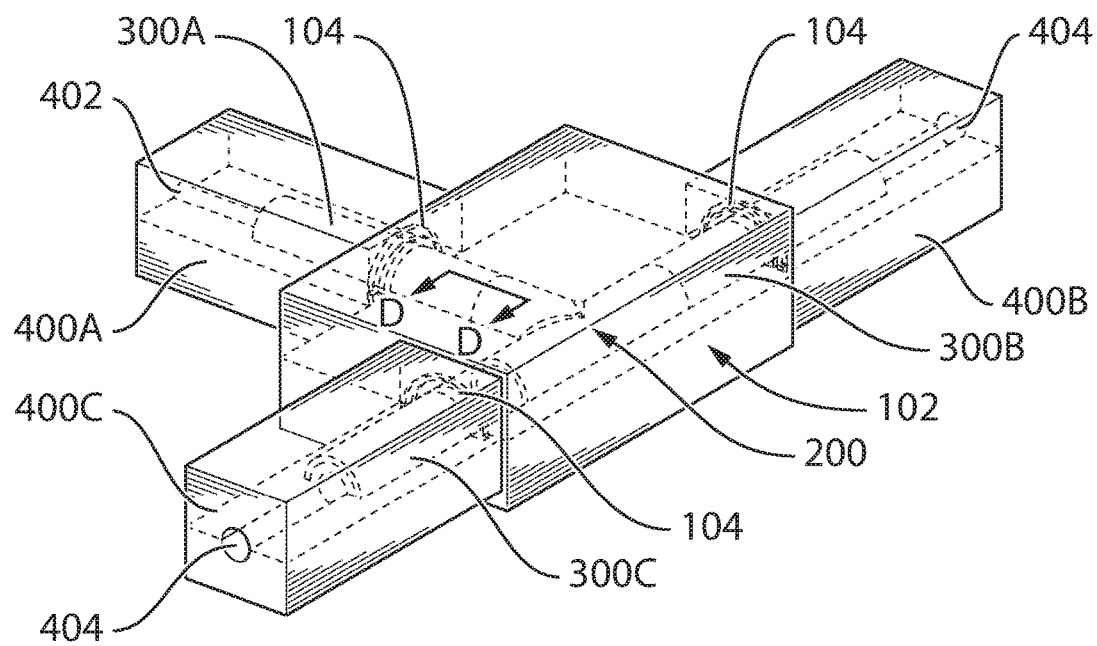
FIG. 4A is a simplified perspective diagram showing a plurality of second molds releasably mounted to the first mold of FIG. 1A.

FIG. 4A is a simplified perspective diagram showing a plurality of second molds 400A-C releasably mounted to the first mold 102 of FIG. 1A. In particular, each second mold 400A-C comprises a tool-locating feature (not labled) for interlocking with one of the tool-locating features 104 of the mold 102. Each second mold 400 has a mold cavity that is defined between opposite forming surfaces thereof, the mold cavity of each second mold 400A-C being aligned with a portion of the mold cavity 106 of mold 102, when in the assembled condition that is shown in FIG. 4A. Also shown in FIG. 4A is the plurality of tube-skeletons 300A-C, each of which extends out of the mold cavity 106 of mold 102 and into the mold cavity of an adjacent one of the second molds 400A-C. The mold assembly that is shown in FIG. 4A is used to form composite tube elements in a second molding step, subsequent to forming the node element 200 in a first molding step.

The second molding step comprises injecting resin via a resin injection port 402 of the second mold 400A. The resin is injected under a pressure that is sufficient to cause the resin to permeate through the fabric material 304 that is supported on the foam core 302 of tube-skeleton 300A. The resin continues to permeate through the fabric material 304, through the interior of node element 200, and then through the fabric material 304 that is supported by the foam core 302 of each of the tube-skeletons 300B and 300C. Vacuum/vent ports 404 of the second molds 400B and 400C facilitate movement of the injected resin through the mold assembly. For instance, vacuum is applied via the vacuum/vent ports 404 in order to draw the resin through the fabric material 304 and out of the second molds 400B and 400C. The injected resin is subsequently heat-cured and bonds with the node element 200, such that an integrated node/tube assembly is formed.

Figure 4B:
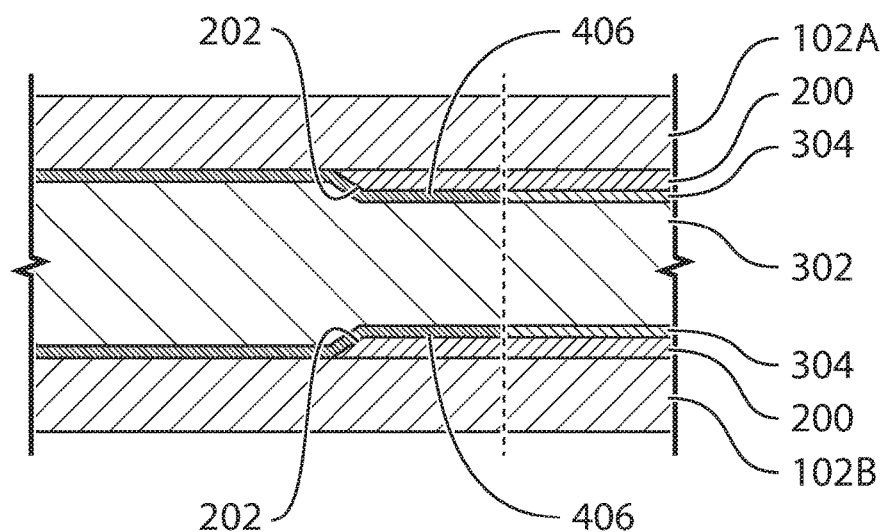
FIG. 4B is a cross-sectional view taken along the line D-D in FIG. 4A.

Referring to FIG. 4B, shown is a cross-sectional view taken along the line D-D in FIG. 4A. In particular, FIG. 4B shows injected resin material 406 that has permeated through the fabric material 304 only as far as the vertical dashed line. The resin material 406 has advanced past the inner beveled surface 202 at the opening of the node element 202, and has entered into the interior of the node element 200. As additional resin material 406 is injected via the resin source 402, the resin material 406 will continue to permeate through the fabric material 304, advancing further through the interior of the node element 200 and eventually being drawn through the second molds 400B and 400C. As noted above, the injected resin material is subsequently heat-cured to form the integrated node/tube assembly.

Figure 5A:
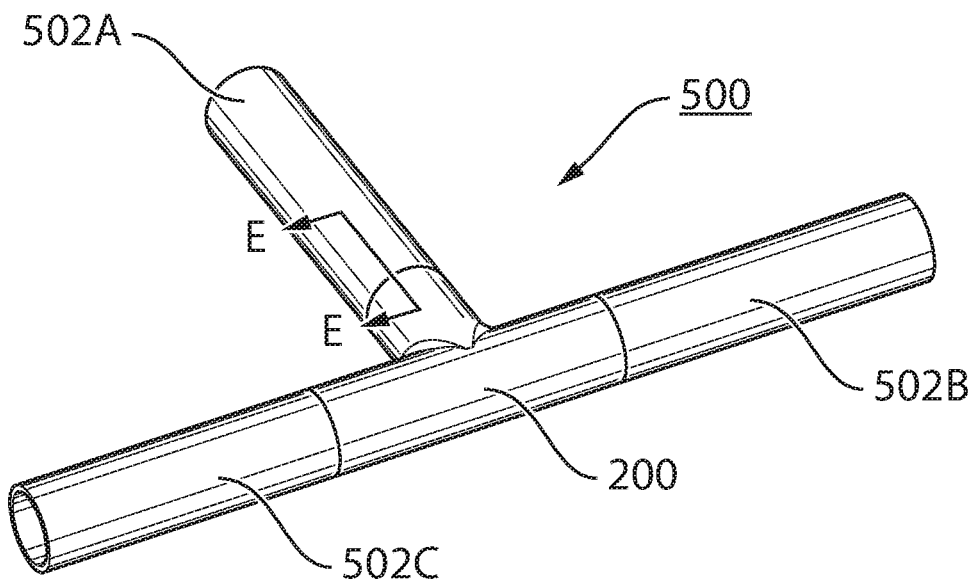
FIG. 5A is a simplified perspective diagram showing a finished composite tube node with integrally formed composite tube sections.
Figure 5B:
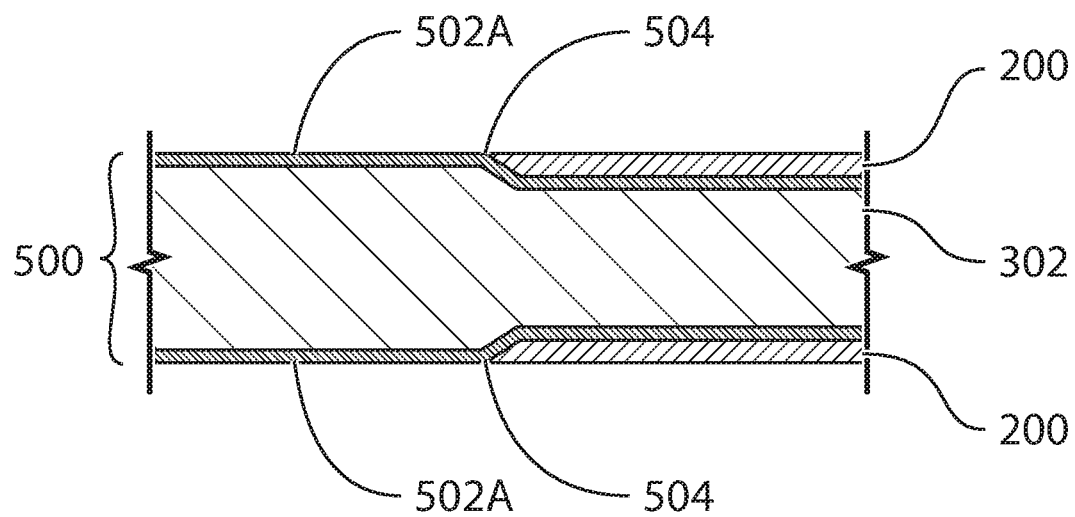
FIG. 5B is a cross-sectional view taken along the line E-E in FIG. 5A.

FIG. 5A shows the integrated node/tube assembly 500 after it has been removed from the mold assembly of FIG. 4A. FIG. 5B is a cross-sectional view taken along the line E-E in FIG. 5A. As is shown most clearly in FIG. 5B, the composite tube element 502A and the node element 200 are joined with a step-less seam 504, and the composite tube element 502A extends through the opening and into the interior of the node element 200. In the specific and non-limiting example that is shown in FIG. 5B, the foam core 302 remains inside the composite tube element 502A subsequent to the second molding step. Optionally, the foam core 302 is removed such as for instance by using a suitable solvent liquid.

The system and method described with reference to FIGS. 1A-5A and 1B-5B uses a first mold to form both the node element 200 as well as a portion of each of the composite tube elements 502A-C. This approach reduces the tooling that is required, results in a stronger part and reduces the finishing steps (i.e. requires no adhesives, allows less edge trimming, reduces fitting issues, etc). The use of the releasably mounted second molds allows large and complicated tube/node assemblies to be fabricated without the need for multiple tooling sets, fitting, etc.

Figure 6:
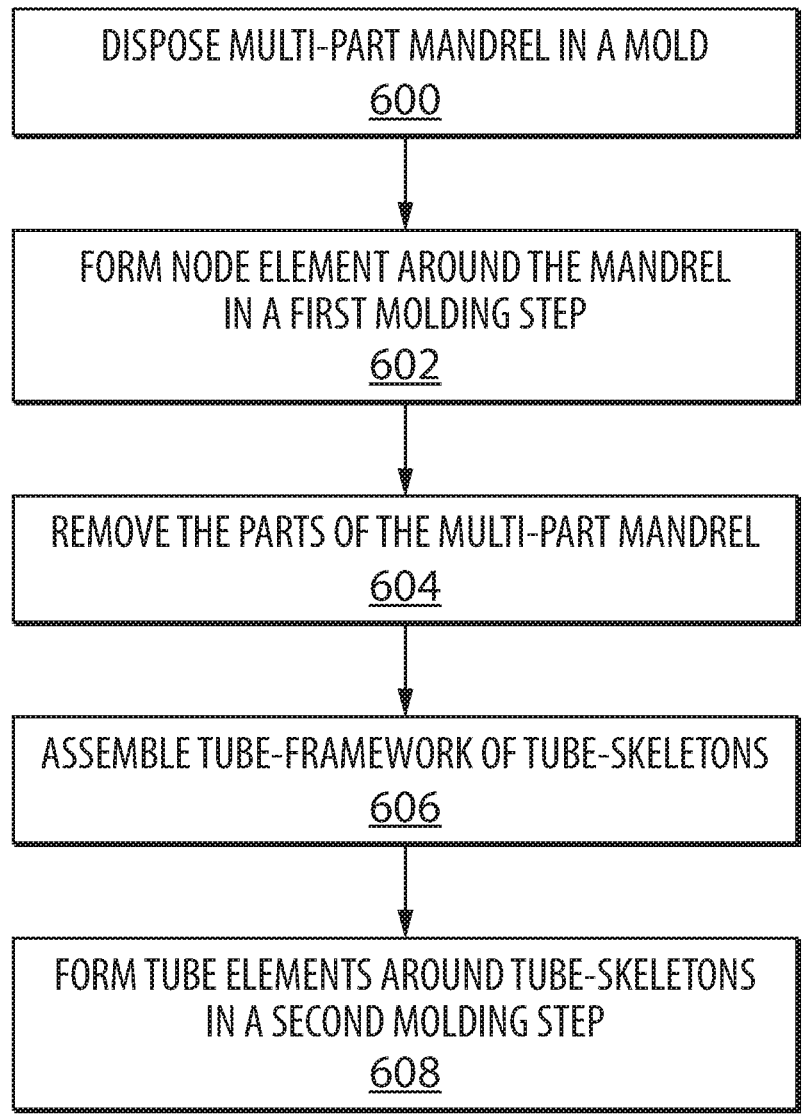
FIG. 6 is a simplified flow diagram for a process according to an embodiment of the invention.

Referring now to FIG. 6, shown is a simplified flow diagram of a process according to an embodiment of the invention. At 600 a multi-part mandrel is disposed within a mold cavity that is defined between opposite forming surfaces of a mold. As discussed in the preceding paragraphs, each part of the multi-part mandrel comprises a first portion that is dimensioned to form a seal with the forming surfaces of the mold, and a second portion that is dimensioned to define a space between the multi-part mandrel and the forming surfaces of the mold. The individual parts of the multi-part mandrel are optionally pinned together to prevent them from separating as the multi-part mandrel is being placed into the mold cavity. Optionally, the multi-part mandrel is fabricated from a material with a relatively high coefficient of thermal expansion (e.g., silicone rubber) or from a material with a relatively low coefficient of thermal expansion (e.g., carbon composite).

At 602, in a first molding step, a composite node element is formed within the space between the parts of the multi-part mandrel and the forming surfaces of the mold. More particularly, a composite material is provided within the space and heat and pressure are applied in order to cure the composite material while the multi-part mandrel is in place. Optionally, the composite material is provided in the form of a glass or carbon filled urethane or epoxy resin that is injected into the space, in which case the glass or carbon fibers are relatively short (e.g. 0.1-4 mm). Alternatively, the composite material is provided in the form of a pre-preg material that is wrapped around the multi-part mandrel prior to disposing the multi-part mandrel in the mold cavity, in which case the glass or carbon fibers are relatively long (greater than 4 mm). When the composite material is provided in the form of a pre-preg material, then the mandrel should be fabricated from silicone rubber or another material that expands, upon heating, by an amount that is sufficient to press the pre-preg material against the forming surfaces of the mold.

At 604 each part of the multi-part mandrel is withdrawn away from the formed node element, thereby exposing openings of the node element. The openings of the node element are in communication with one another via an open internal structure of the node element, which is the result of the presence of the mandrel within the mold cavity during the first molding step. At 606 a tube-framework is assembled, which comprises inserting tube-skeletons into the openings of the node element while the node element is still within the mold. In particular, each tube-skeleton comprises a foam core supporting a tube-shaped covering of a fiber-containing fabric extending along a length of the foam core. At 608, in a second molding step, a composite tube element is formed on each of the tube-skeletons, which comprises injecting a resin material into the mold cavity such that the resin material permeates through the fiber-containing fabric and into an interior of the node element via the openings. The injected resin material is heat-cured, thereby joining the formed tube elements to the node element to form an integrated node/tube assembly.

Figure 7:
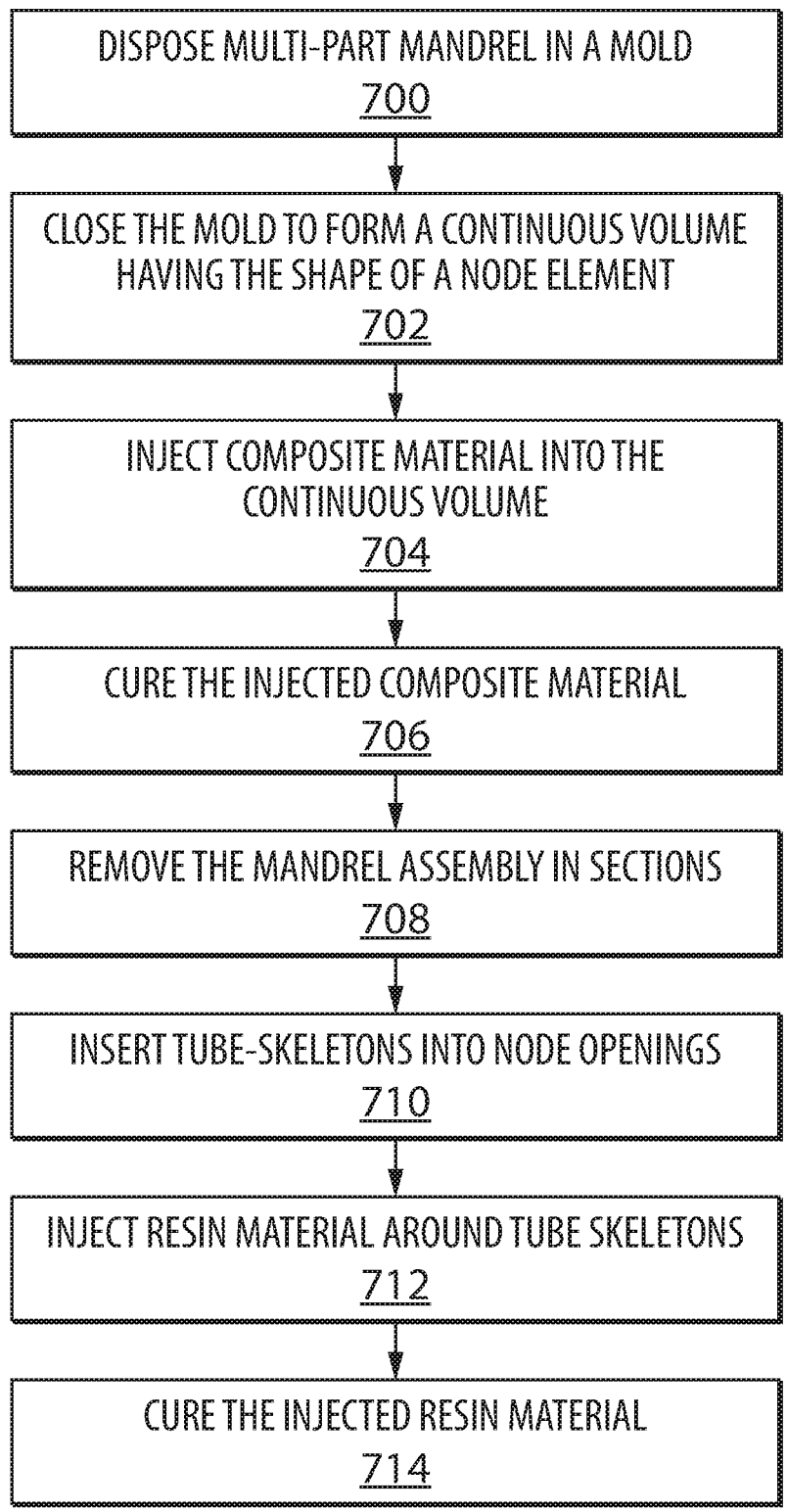
FIG. 7 is a simplified flow diagram for another process according to an embodiment of the invention.

Referring now to FIG. 7, shown is a simplified flow diagram of a process according to an embodiment of the invention. At 700 a mandrel assembly is disposed within a mold cavity that is bounded by forming surfaces of a mold. In particular, the mandrel assembly is a multi-part mandrel. The mandrel assembly comprises first portions that are dimensioned to form a seal with the forming surfaces of the mold, and second portions that are dimensioned to define a space between the multi-part mandrel and the forming surfaces of the mold. The individual parts of the multi-part mandrel are optionally pinned together to prevent them from separating as the multi-part mandrel is being placed into the mold cavity. Optionally, the multi-part mandrel is fabricated from a material with a relatively high coefficient of thermal expansion (e.g., silicone rubber) or from a material with a relatively low coefficient of thermal expansion (e.g., carbon).

At 702 the mold is closed, such that the first portions of the mandrel assembly seal against the forming surfaces of the mold, and such that a continuous volume having the shape of a node element is defined between the second portions of the mandrel and the forming surfaces of the mold. At 704 a composite material is injected into the mold cavity to fill the continuous volume. For instance, the composite material is a glass or carbon fiber-filled urethane or epoxy resin. At 706 the injected composite material is cured, so as to form the node element. At 708 the mandrel assembly is removed in sections, wherein removing each mandrel section exposes an opening of the node element. At 710 tube-skeletons are inserted into the openings of the node element, each tube-skeleton comprising a glass or carbon fabric material that is supported on a foam core. At 712 a resin material is injected into the mold cavity such that the resin material permeates through the glass or carbon fabric material and into an interior of the node element via the openings. At 714 the injected resin material is cured, thereby forming tube elements joined to the node element.

While the above description constitutes a plurality of embodiments of the present invention, it will be appreciated that the present invention is susceptible to further modification and change without departing from the fair meaning of the accompanying claims.

What is claimed is:

1. A system, comprising:
    a mold having opposite forming surfaces that define a mold cavity when the mold is in a closed condition, the opposite forming surfaces comprising first features for forming an outer surface of a node element and comprising second features for forming a first portion of an outer surface of each one of a plurality of tube elements;
    a multi-part mandrel fabricated from a resilient material and comprising first portions that are dimensioned for sealing against the second features of the forming surfaces of the mold, and comprising second portions that are dimensioned to define a continuous volume between the multi-part mandrel and the first features of the forming surfaces of the mold, the continuous volume having the shape of the node element;
    a plurality of tube-skeletons, each tube-skeleton comprising a foam core that is encased by a fiber-containing fabric material, and each tube-skeleton being dimensioned at least at one end thereof substantially the same as the second portions of the multi-part mandrel; and a second mold having opposite forming surfaces that define a second mold cavity when the second mold is in a closed condition, the opposite forming surfaces of the second mold comprising third features for forming a second portion of the outer surface of one of the plurality of tube elements.

2. The system according to claim 1, wherein the multi-part mandrel is fabricated from silicone rubber.

3. The system according to claim 1, wherein the multi-part mandrel comprises third portions, the third portions joining the first portions and the second portions and defining tapered surfaces between the first portions and the second portions.

4. The system according to claim 3, wherein the foam core of each tube-skeleton comprises a complementary feature for seating against the inner beveled surface at the respective opening of the node element.

5. The system according to claim 1, wherein the mold comprises a tool-locating feature and wherein the second mold comprises a complementary feature for releasably engaging the tool-locating feature such that the second mold cavity is aligned with the mold cavity.

6. A system, comprising:
a first mold having opposite forming surfaces that define a first mold cavity when the first mold is in a closed condition, the opposite forming surfaces comprising first features for forming an outer surface of a node element and comprising second features for forming a first portion of an outer surface of each tube element of a plurality of tube elements;

a multi-part mandrel shaped to define a continuous volume between the multi-part mandrel and the first features of the forming surfaces of the mold, the continuous volume having the shape of the node element;

a plurality of second molds, each second mold detachably mountable to the first mold and having opposite forming surfaces comprising third features for forming a second portion of the outer surface of a respective one of the plurality of tube elements; and a plurality of tube-skeletons, each tube-skeleton dimensioned to engage an inner surface of the node element, to extend away from the node element out of the first mold, and to extend into a respective second mold of the plurality of second molds, wherein the first portion and the second portion of the outer surface of each tube element of the plurality of tube elements is formed in a single molding step.

7. The system according to claim 6, wherein the multi-part mandrel is fabricated from silicone rubber.

8. The system according to claim 6, wherein the multi-part mandrel comprises first portions that are dimensioned for sealing against the second features of the opposite forming surfaces of the mold, and second portions that are dimensioned to define the continuous volume between the multi-part mandrel and the first features of the opposite forming surfaces of the mold.

9. The system according to claim 8, wherein each part of the multi-part mandrel comprises a third portion, the third portion joining a respective first portion and a respective second portion and defining a tapered surface between the respective first portion and the respective second portion, the third portion for forming an inner beveled surface at a respective opening of the node element.

10. The system according to claim 9, wherein each tube-skeleton comprising a foam core that is encased by a fiber-containing fabric material.

11. The system according to claim 10, wherein the foam core of each tube-skeleton comprises a complementary feature for seating against the inner beveled surface at the respective opening of the node element.

* * * * *

UNITED STATES PATENT AND TRADEMARK OFFICE
CERTIFICATE OF CORRECTION

PATENT NO. : 10,328,642 B2
APPLICATION NO. : 15/311494
DATED : June 25, 2019
INVENTOR(S) : Todd Deaville and Andrea Pretzler It is certified that error appears in the above-identified patent and that said Letters Patent is hereby corrected as shown below:

In the Specification

Column 3, Line 23, delete "BRIEF DESCRIPTION OF TILE DRAWINGS", insert --BRIEF DESCRIPTION OF THE DRAWINGS--

Column 4, Line 32, delete "forming surface 10813 of the", insert --forming surface 108B of the--

Column 5, Line 36, delete "pre-prey, material comprising", insert --pre-preg material comprising--

Signed and Sealed this
Third Day of September, 2019

Andrei Iancu
*Director of the United States Patent and Trademark Office*